US012517453B2

(12) United States Patent
Koide

(10) Patent No.: US 12,517,453 B2
(45) Date of Patent: Jan. 6, 2026

(54) IMAGE FORMING APPARATUS

(71) Applicant: Hironari Koide, Kanagawa (JP)

(72) Inventor: Hironari Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/606,326

(22) Filed: Mar. 15, 2024

(65) Prior Publication Data

US 2024/0319651 A1 Sep. 26, 2024

(30) Foreign Application Priority Data

Mar. 20, 2023 (JP) ................................ 2023-044073

(51) Int. Cl.
*G03G 15/00* (2006.01)
*B65H 7/04* (2006.01)

(52) U.S. Cl.
CPC ............ *G03G 15/553* (2013.01); *B65H 7/04* (2013.01); *G03G 15/5008* (2013.01); *G03G 15/6508* (2013.01); *B65H 2405/36* (2013.01)

(58) Field of Classification Search
CPC ............ G03G 15/553; G03G 15/5008; G03G 15/6508; B65H 7/04; B65H 2405/36
See application file for complete search history.

(56) References Cited

U.S. PATENT DOCUMENTS 7,011,463 B2 * 3/2006 Matsuse ................ B41J 15/042 400/594
8,532,508 B2 * 9/2013 Kurita ................ G03G 15/6564 399/82
10,005,629 B2 * 6/2018 Hojo .................. G03G 15/6564
2008/0037059 A1 * 2/2008 Inoue .................... G06F 3/1285 358/1.15
2012/0002230 A1 * 1/2012 Yamazaki .............. G06K 15/16 358/1.13
2015/0153686 A1 * 6/2015 Tanaka ............... G03G 15/5058 399/49

FOREIGN PATENT DOCUMENTS

JP 2000-327177 A 11/2000
JP 2002-323839 A 11/2002

OTHER PUBLICATIONS

JP 2002-232839 English Translation (Year: 2002).*

* cited by examiner

*Primary Examiner* — David H Banh
(74) *Attorney, Agent, or Firm* — IPUSA, PLLC

(57) ABSTRACT

An image forming apparatus includes an image forming device, a transfer section, a plurality of sheet feed trays, processing circuitry, and a detector. The image forming device forms an image. The transfer section transfers the image onto a sheet. The plurality of sheet feed trays store sheets and supply the sheets from sheet feed ports to the transfer section. The processing circuitry switches sheet feeding from one sheet feed tray in use to another sheet feed tray when the sheets run out in the one sheet feed tray in use. The detector detects a remaining amount of sheets in the one sheet feed tray in use. The processing circuitry enlarges spacing between images formed by the image forming device when the remaining amount of sheets in the one sheet feed tray in use is equal to or less than a threshold value, based on a detection result of the detector.

8 Claims, 14 Drawing Sheets

IMAGE FORMING APPARATUS

CROSS-REFERENCE TO RELATED APPLICATION

This patent application is based on and claims priority pursuant to 35 U.S.C. § 119(a) to Japanese Patent Application No. 2023-044073, filed on Mar. 20, 2023, in the Japan Patent Office, the entire disclosure of which is hereby incorporated by reference herein.

BACKGROUND

Technical Field

Embodiments of the present disclosure relate to an image forming apparatus.

Related Art

An image forming apparatus is known that can disable detection of a paper-end state in order to prevent unnecessary control due to erroneous detection of the paper-end state. In a configuration including a plurality of sheet feed trays, an image forming apparatus is known that has a function to retry a print image when sheets run out in a sheet feed tray in use and the sheet feed tray is switched to another sheet feed tray. The function to retry the print image is a function of deleting (cleaning) a print image on a transferor once and forming the same print image again when conveyance of the sheet is not in time for the print image that is already formed on a photoconductor.

SUMMARY

In an embodiment of the present disclosure, there is provided an image forming apparatus that includes an image forming device, a transfer section, a plurality of sheet feed trays, processing circuitry, and a detector. The image forming device forms an image onto a sheet. The transfer section transfers the image onto the sheet. The plurality of sheet feed trays store sheets and supply the sheets from a sheet feed port of each of the plurality of sheet feed trays to the transfer section. The processing circuitry switches sheet feeding from one sheet feed tray in use to another sheet feed tray of the plurality of sheet feed trays when the sheets run out in the one sheet feed tray in use. The detector detects a remaining amount of sheets in the one sheet feed tray in use. The processing circuitry enlarges spacing between images formed by the image forming device when the remaining amount of sheets in the one sheet feed tray in use is equal to or less than a threshold value, based on a detection result of the detector.

In another embodiment of the present disclosure, there is provided an image forming apparatus that includes an image forming device, a transfer section, a plurality of sheet feed trays, processing circuitry, and a detector. The image forming device forms an image onto a sheet. The transfer section transfers the image onto the sheet. The plurality of sheet feed trays store sheets and supply the sheets from a sheet feed port of each of the plurality of sheet feed trays to the transfer section. The processing circuitry switches sheet feeding from one sheet feed tray in use to another sheet feed tray of the plurality of sheet feed trays when the sheets run out in the one sheet feed tray in use. The detector detects a remaining amount of sheets in the one sheet feed tray in use. The processing circuitry, when the sheets run out in the one sheet feed tray in use, slows down an image forming speed of the image formed by the image forming device, based on a detection result of the detector, until a sheet fed from said another sheet feed tray reaches the transfer section.

In still another embodiment of the present disclosure, there is provided an image forming apparatus includes an image forming device, a transfer section, a plurality of sheet feed trays, processing circuitry, and a sensor. The image forming device forms an image onto a sheet. The transfer section transfers the image onto the sheet. The plurality of sheet feed trays store sheets and supply the sheets from a sheet feed port of each of the plurality of sheet feed trays to the transfer section. The processing circuitry switches sheet feeding from one sheet feed tray in use to another sheet feed tray of the plurality of sheet feed trays when the sheets run out in the one sheet feed tray in use. The sensor detects run-out of the sheets stored in the one sheet feed tray in use and is disposed adjacent to an end fence. The processing circuitry enlarges spacing between images formed by the image forming device, when the run-out of the sheets stored in the one sheet feed tray in use is detected by the sensor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
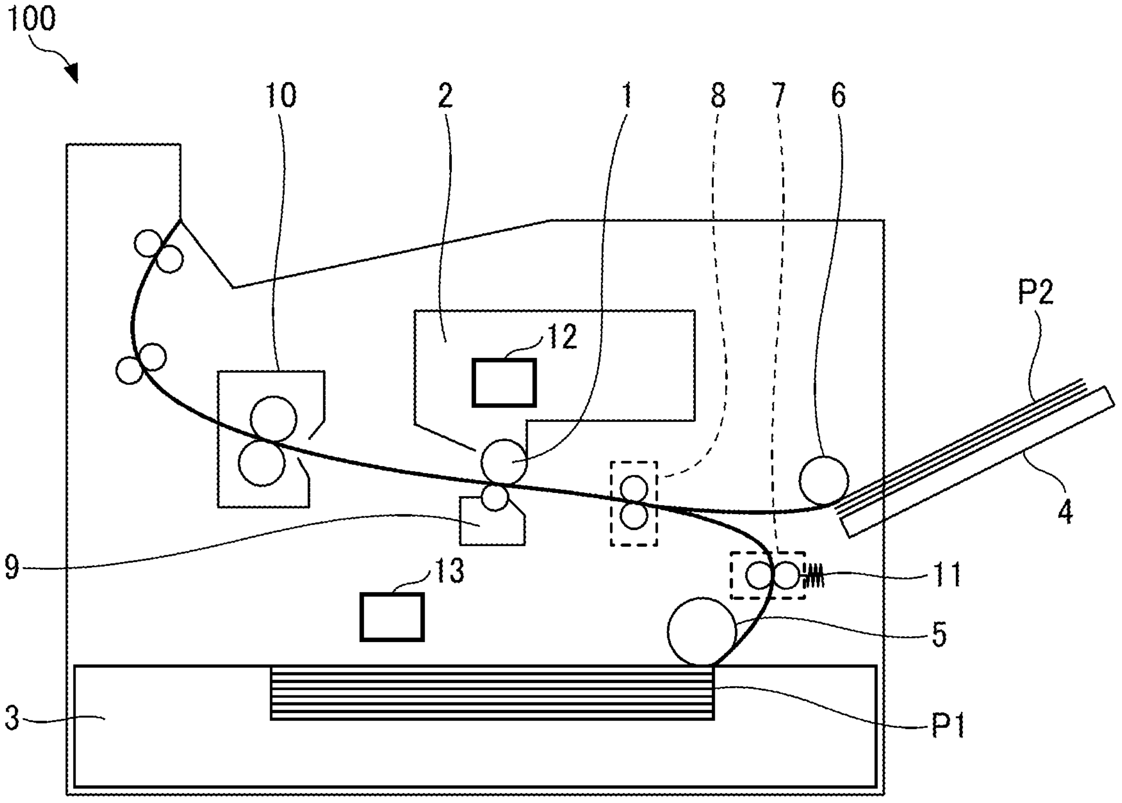
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. In order to facilitate the understanding of the description, like reference signs denote like elements in the drawings, and overlapping description may be simplified or omitted as appropriate. As used herein, the singular forms “a,” “an,” and “the” are intended to include the plural forms as well, unless the context clearly indicates otherwise.

First Embodiment

A description is given of a first embodiment with reference to FIGS. 1 to 10.

With reference to FIGS. 1 to 4, a description is given of a basic configuration of an image forming apparatus 100 according to the first embodiment of the present disclosure. FIG. 1 is a schematic view of the image forming apparatus 100 according to the first embodiment of the present disclosure.

The image forming apparatus 100 forms a latent image at an exposure section 12 in the apparatus, and forms an image P (see FIG. 2) on an image bearer 1 at an image forming device 2 including the image bearer 1. A sheet conveyed one by one by a main feed roller 5 or a bypass feed roller 6 from a sheet bundle P1 stacked in the main sheet feed tray 3 or a sheet bundle P2 stacked in the bypass sheet feed tray 4 toward the image bearer 1 on which the image P is formed. The sheet is conveyed in a nipped state by a conveying roller pair 7, and is timing-controlled by a registration roller pair 8. The image P is transferred on the sheet in a transfer section 9 and is heated and pressed on the sheet in a fixing device 10 to be fixed on the sheet, and then the sheet is ejected to the outside of the apparatus. The conveying roller pair 7 also includes an elastic member 11 that biases one roller toward the other roller, and conveys the sheet downstream from the conveying roller pair 7 while the sheet is strongly nipped by the conveying roller pair 7.

The image forming apparatus 100 includes, for example, a control device 13 inside a housing. The control device 13 controls operation of each of the above-described components in the image forming apparatus 100.

Figure 2:
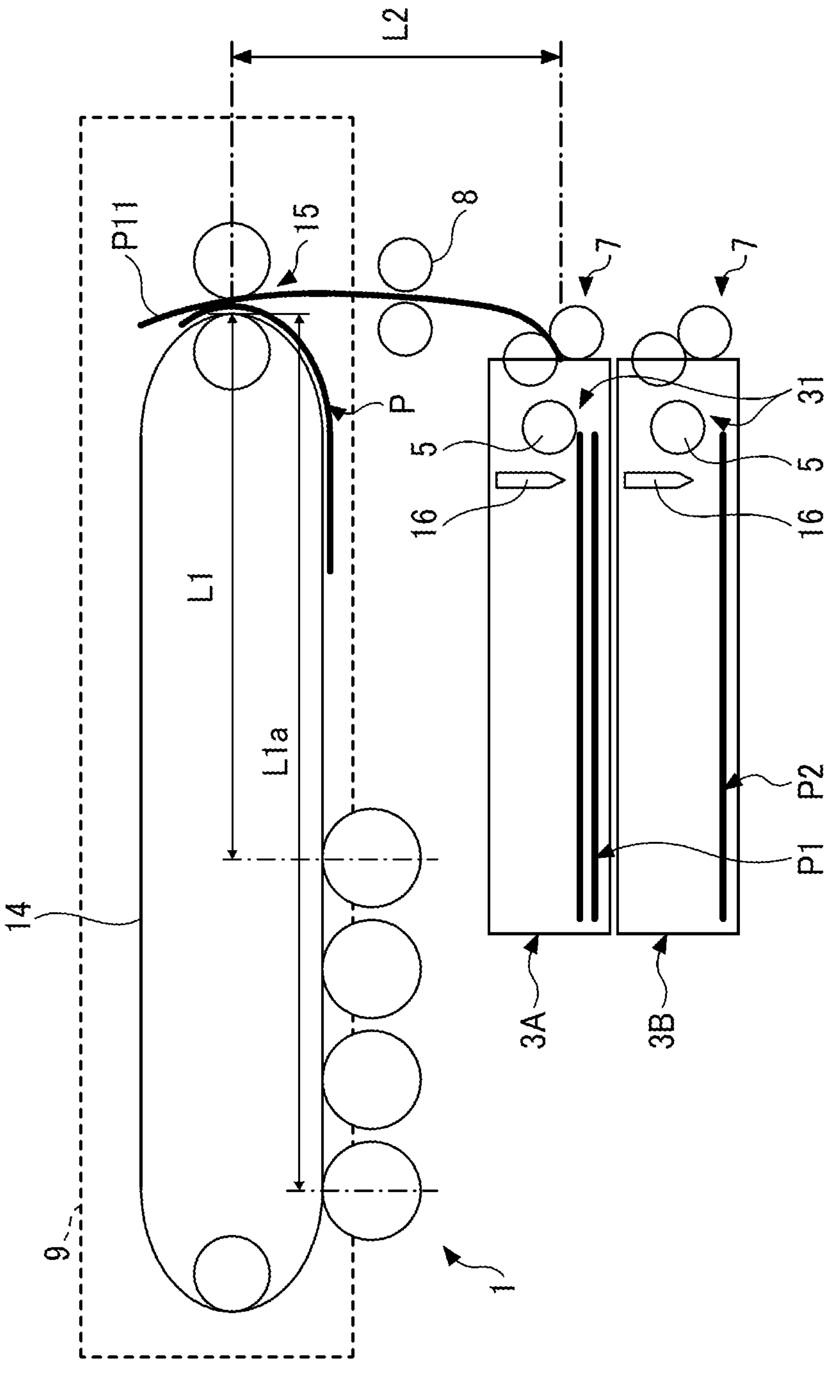
FIG. 2 is a diagram illustrating a configuration of a transfer section in FIG. 1.

FIG. 2 is a diagram illustrating an example of the configuration of the transfer section 9 in FIG. 1. In FIG. 2, a group of rollers corresponding to the main sheet feed roller 5, the conveying roller pair 7, and the registration roller pair 8 illustrated in FIG. 1 are also illustrated.

The image forming apparatus 100 has a configuration that includes a plurality of sheet feed trays that store sheets and supply the sheets from a sheet feed port 31 to the transfer section 9. FIG. 1 illustrates the configuration including two sheet feed trays of the main sheet feed tray 3 and the bypass sheet feed tray 4, whereas FIG. 2 illustrates the configuration including two sheet feed trays of the main sheet feed trays 3A and 3B.

As illustrated in FIG. 2, the transfer section 9 includes, for example, an intermediate transfer belt 14 and a secondary transfer device 15. For example, as illustrated in FIG. 2, a plurality of image bearers 1 (for four colors in the example of FIG. 2) are disposed for respective colors, and the images P formed on the plurality of image bearers 1 are first transferred on the intermediate transfer belt 14. The intermediate transfer belt 14 is an endless belt, and the image P is transferred on an outer circumferential surface thereof. The intermediate transfer belt 14 can move the transferred image P from the position of the image bearer 1 toward the position of the secondary transfer device 15.

The secondary transfer device 15 has a roller pair, and the intermediate transfer belt 14 and a sheet P11 conveyed from the registration roller pair 8 are passed between the roller pair. The secondary transfer device 15 conveys the sheet downstream in a state where the printing surface of the sheet faces and contacts the outer circumferential surface of the intermediate transfer belt 14, and thus can transfer the image P onto the printing surface of the sheet.

A sheet detection sensor 16 (detector) is disposed in each of the sheet feed trays 3A and 3B. In the present embodiment, the sheet detection sensor 16 is disposed in the vicinity of the sheet feed port 31 through which the sheet is conveyed from the sheet feed tray 3A or 3B to the transfer section 9, and can detect the remaining amount of sheets in each of the sheet feed trays 3A and 3B to determine a plurality of states including at least three states of a full state, a near-end state, and a paper-end state (out of sheet). The sheet detection sensor 16 may be a sensor of a type other than the type according to the present embodiment that determines a plurality of states, or for example, may be a sensor that measures the remaining number of sheets, or may be a combination of a sensor that detects only a near-end state or a sensor that detects only a paper-end state.

In the image forming apparatus 100 according to the present embodiment, as illustrated in FIG. 2, a distance L2 from the sheet feed port 31 of the sheet feed tray 3A (or a distance from the sheet feed port 31 of the sheet feed tray 3B) is shorter than a distance L1 from the image forming device 2 (the image bearer 1) to the transfer position (the contact position of the pair of rollers of the secondary transfer device 15) of the sheet P at which the transfer section 9 transfers the image P onto the sheet P11. In other words, the components are arranged so as to satisfy the relation of L1>L2.

Figure 3:
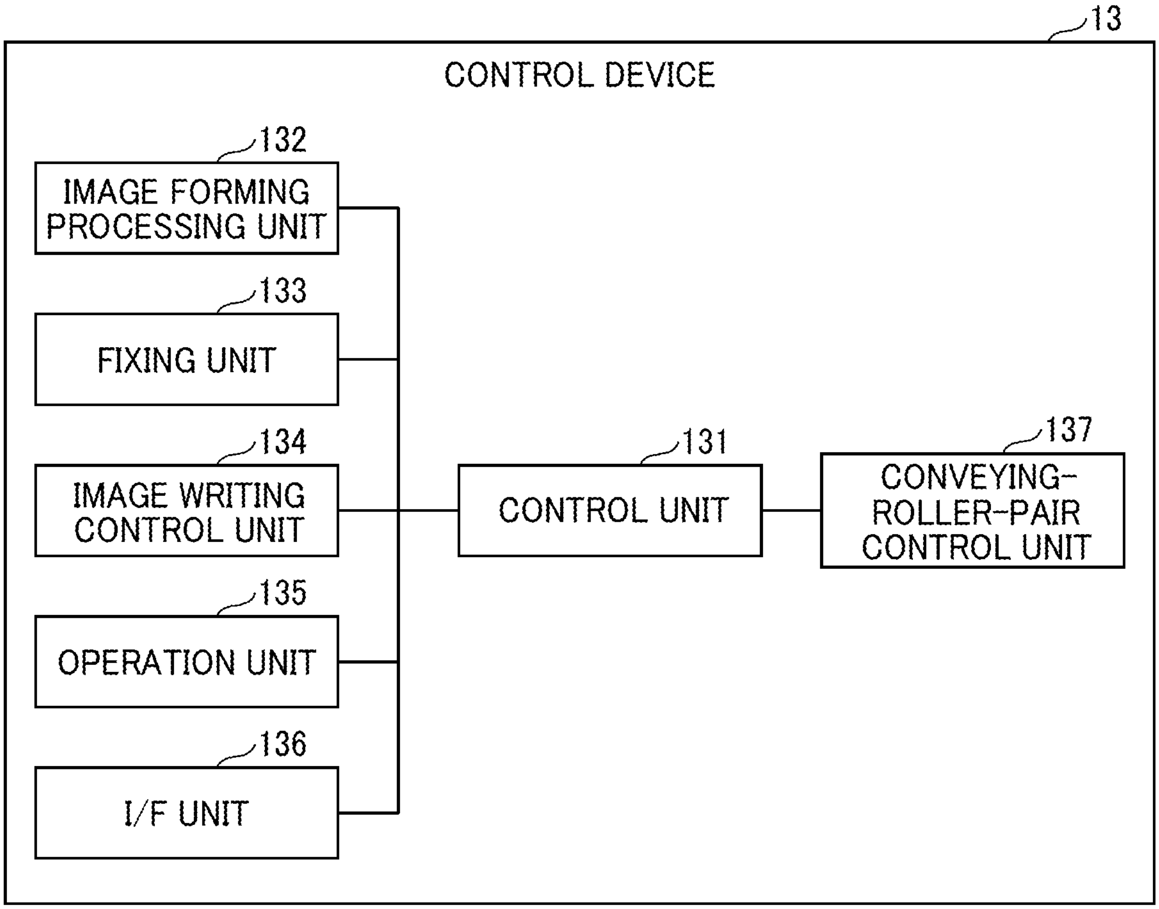
FIG. 3 is a functional block diagram of a control device.

FIG. 3 is a functional block diagram of the control device 13. As illustrated in FIG. 3, the control device 13 includes a control unit 131, an image forming processing unit 132, a fixing unit 133, an image writing control unit 134, an operation unit 135, an interface (I/F) unit 136, and a conveying-roller-pair control unit 137.

The control unit 131 controls a series of operations in each of the functional blocks described above.

The image forming processing unit 132 generates a toner image from image data transmitted from a terminal device by an electrophotographic method and transfers the toner image onto the sheet P11. When a positional deviation is detected during printing, the image forming processing unit 132 corrects the positional deviation.

The fixing unit 133 applies heat and pressure to the sheet P11 onto which the toner image is transferred by the image forming processing unit 132 to fix the toner image on the sheet P11.

The image writing control unit 134 converts the image data transmitted from the I/F unit 136 into a control signal, and controls writing of the latent image onto the image bearer 1.

The operation unit 135 displays a state of the image forming apparatus 100 via an input-and-output device such as an operation panel, and receives an input to the image forming apparatus 100.

The I/F unit 136 communicates with a terminal device that performs a print request to the image forming apparatus 100. The I/F unit 136 transmits the image data transmitted from the terminal device to the control unit 131, and performs a print request to the image forming apparatus 100.

The conveying-roller-pair control unit 137 controls, for example, the main sheet feed roller 5, the conveying roller pair 7, and the registration roller pair 8 illustrated in FIG. 1 to control the conveyance of the sheet P11.

Figure 4:
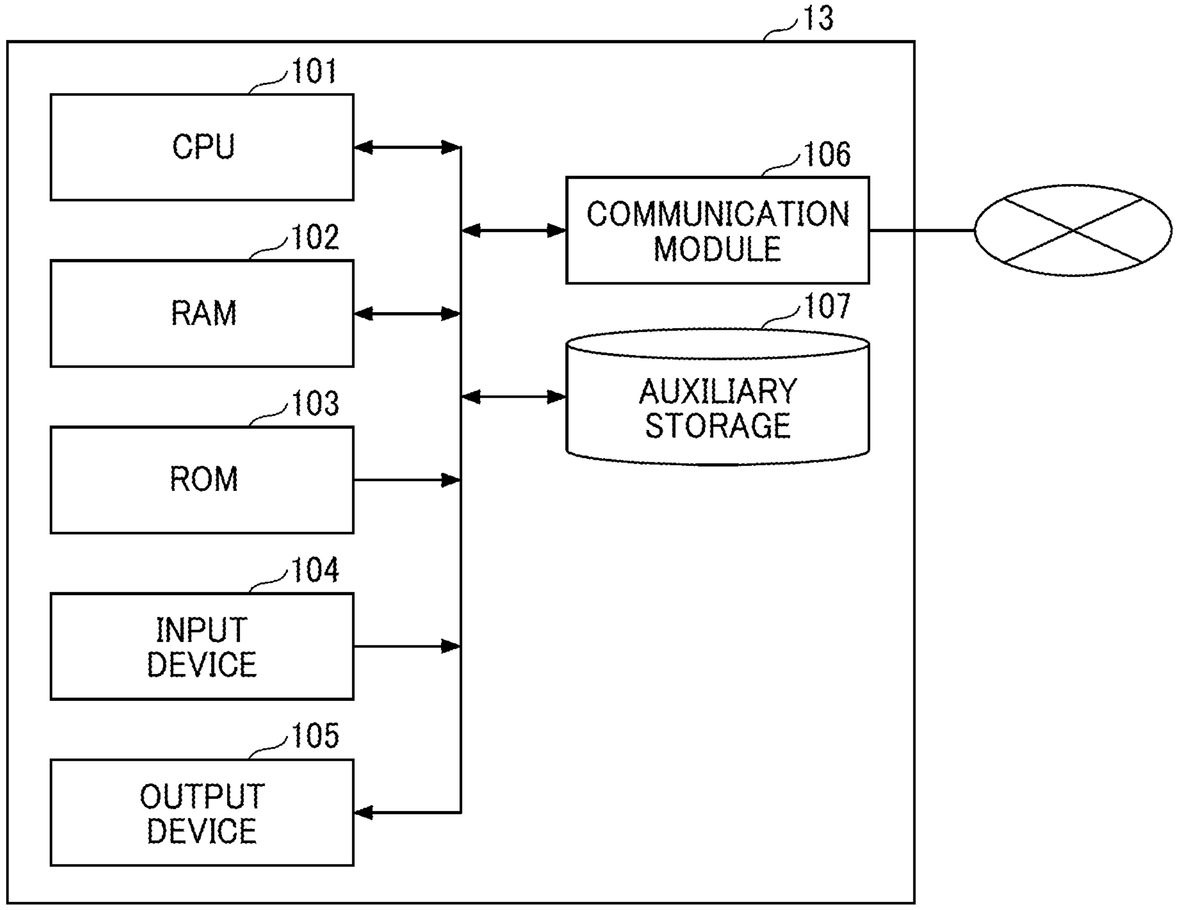
FIG. 4 is a diagram illustrating a hardware configuration of the control device of FIG. 3.

FIG. 4 is a diagram illustrating a hardware configuration of the control device 13. As illustrated in FIG. 4, the control device 13 can be physically configured as a computer system including a central processing unit (CPU) 101, a random-access memory (RAM) 102 and a read-only memory (ROM) 103 that are main storage devices, an input device 104 such as a keyboard and a mouse that are input devices, an output device 105 such as a display, a communication module 106 that is a data transmission-and-reception device such as a network card, and an auxiliary storage 107. The functions of the control device 13 described with reference to FIG. 3 are implemented by reading specified computer software onto hardware such as the CPU 101 and the RAM 102 to operate the communication module 106, the input device 104, and the output device 105 under the control of the CPU 101, to read and write data in the RAM 102 and the auxiliary storage 107.

With reference to FIGS. 5 to 10, a description is given of image-spacing enlarging control according to the first embodiment of the present disclosure.

Figure 5B:
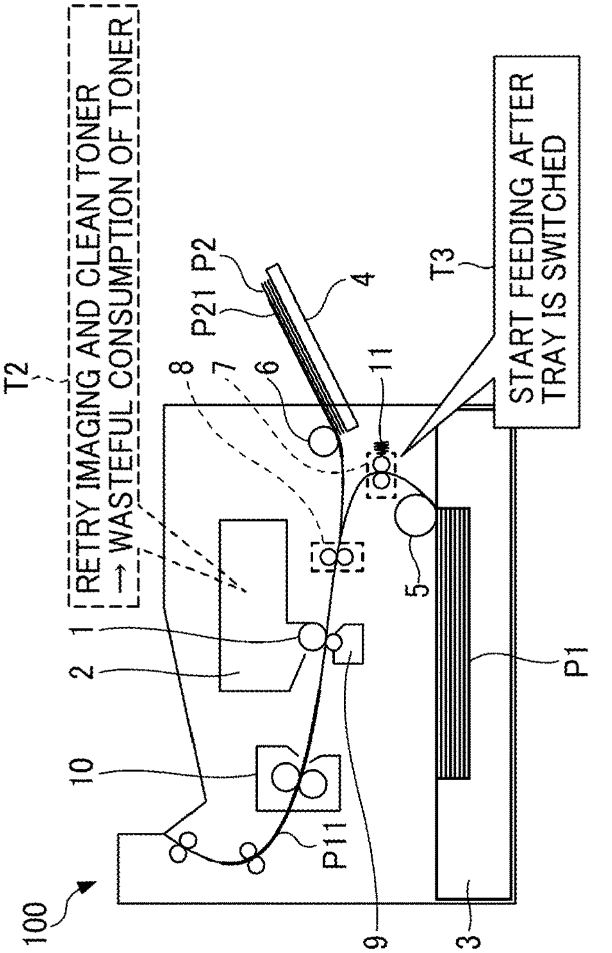
FIGS. 5A and 5B are diagrams illustrating a comparative example of an operation at a time when a paper-end state is detected.
Figure 5A:
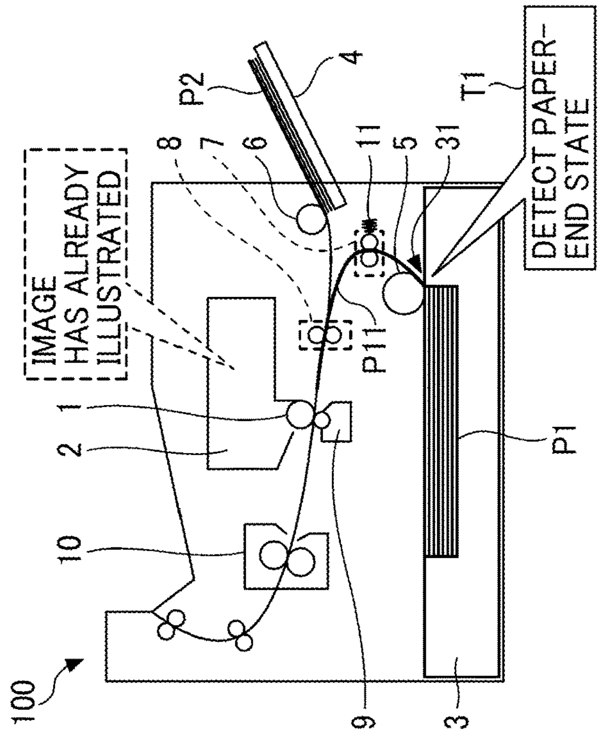

FIGS. 5A and 5B are diagrams illustrating an operation at the time of a paper-end state in a comparative example. As illustrated in FIG. 2, in the present embodiment, a paper-end sensor (sheet detection sensor 16) that detects a paper-end state is disposed at the entrance of the sheet feed port 31. With this configuration, the paper-end state is detected at the timing when the trailing end of the last sheet exits from the sheet feed tray 3. Accordingly, the paper-end state is determined at the timing T1 when the trailing end of the sheet P11 passes through the entrance of the sheet feed port 31 as illustrated in FIG. 5A.

In a case of a configuration in which the image P is formed on the image bearer 1 before starting of sheet feed, as illustrated in FIG. 5A, the image P has already been formed on the image bearer 1 at the timing T1 when the paper-end state is determined. Accordingly, as illustrated in FIG. 5B, in a case where sheets run out in the main sheet feed tray 3 and the sheet feed is switched to the sheet feed from the bypass sheet feed tray 4, it is necessary to perform retry of the image P and cleaning of the image bearer 1 at a timing T2 that is before a timing T3 at which sheet feed of the sheet P21 from the bypass sheet feed tray 4 is started after the switching, which leads to wasteful consumption of toner.

Figure 6A:
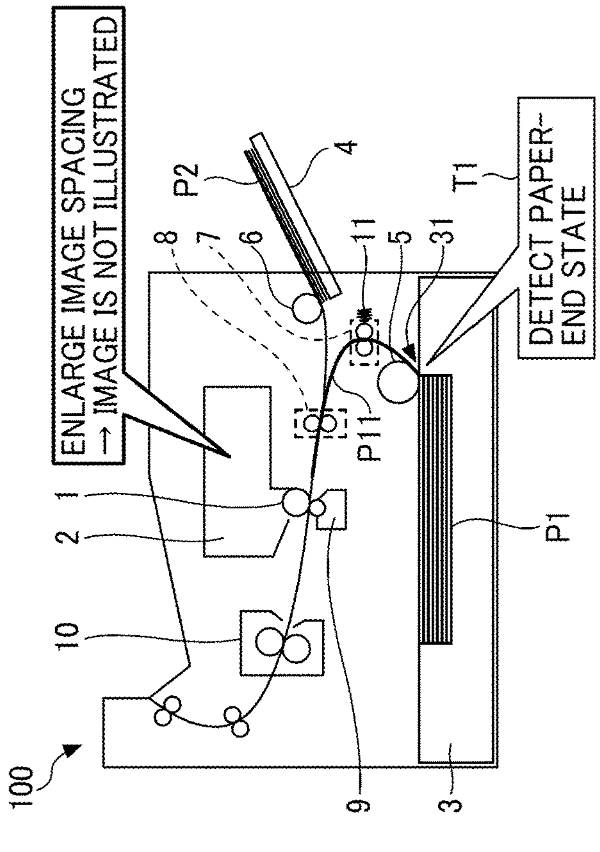
FIGS. 6A and 6B are diagrams illustrating an operation at a time when a paper-end state is detected, according to an embodiment of the present disclosure.
Figure 6B:
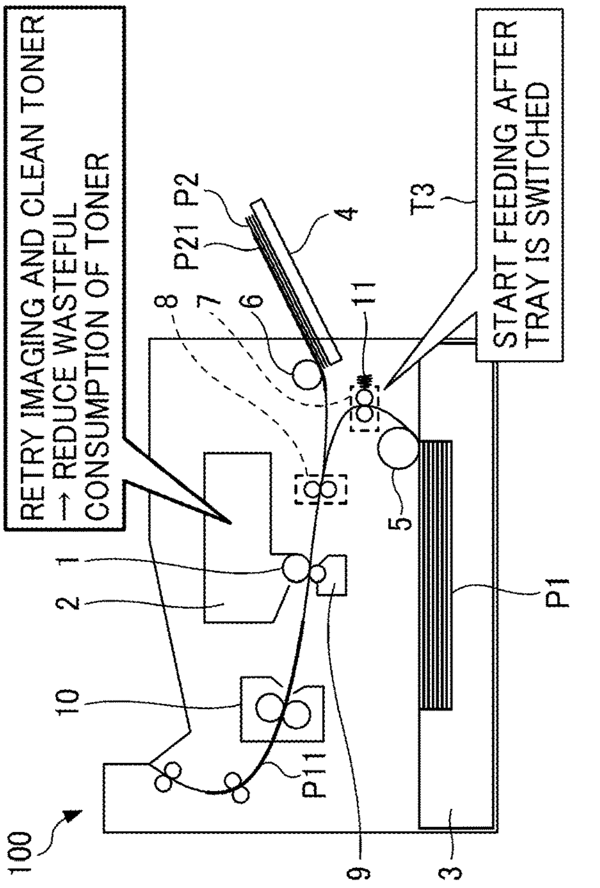

FIGS. 6A and 6B are diagrams illustrating an operation at the time of a paper-end state according to the present embodiment. In the present embodiment, the image-spacing enlarging control is executed when the sheet feed tray is switched in order to solve a problem in the comparative example described with reference to FIG. 5. In the image-spacing enlarging control, when a near-end state of the remaining amount of sheets in the main sheet feed tray 3 in use is detected by the sheet detection sensor 16, the spacing of images P formed by the image forming device 2 is enlarged.

When the image spacing is enlarged in this way, as illustrated in FIG. 6A, an image P is not yet formed on the image bearer 1 at the timing T1 when a paper-end state is determined. Accordingly, as illustrated in FIG. 6B, in a case where sheets run out in the main sheet feed tray 3 and the sheet feed is switched to the sheet feed from the bypass sheet feed tray 4, it is not necessary to retry the image P and clean the image bearer 1 before the timing T3 when the feed of the sheet P21 from the bypass sheet feed tray 4 is started after the switching, which can reduce wasteful toner consumption.

In particular, as described with reference to FIG. 2, the case described in FIGS. 5A and 5B tends to occur when the structure (L1>L2) in which the distance L2 from the sheet feed port 31 of the sheet feed tray 3A (or the sheet feed tray 3B) to the transfer position is shorter than the distance L1 from the image forming device 2 (the image bearer 1) to the transfer position (the contact position of the roller pair of the secondary transfer device 15) of the image P to the sheet P11 by the transfer section 9. Thus, the effect of the image-spacing enlarging control illustrated in FIG. 6 can be particularly notably exerted.

Figure 7:
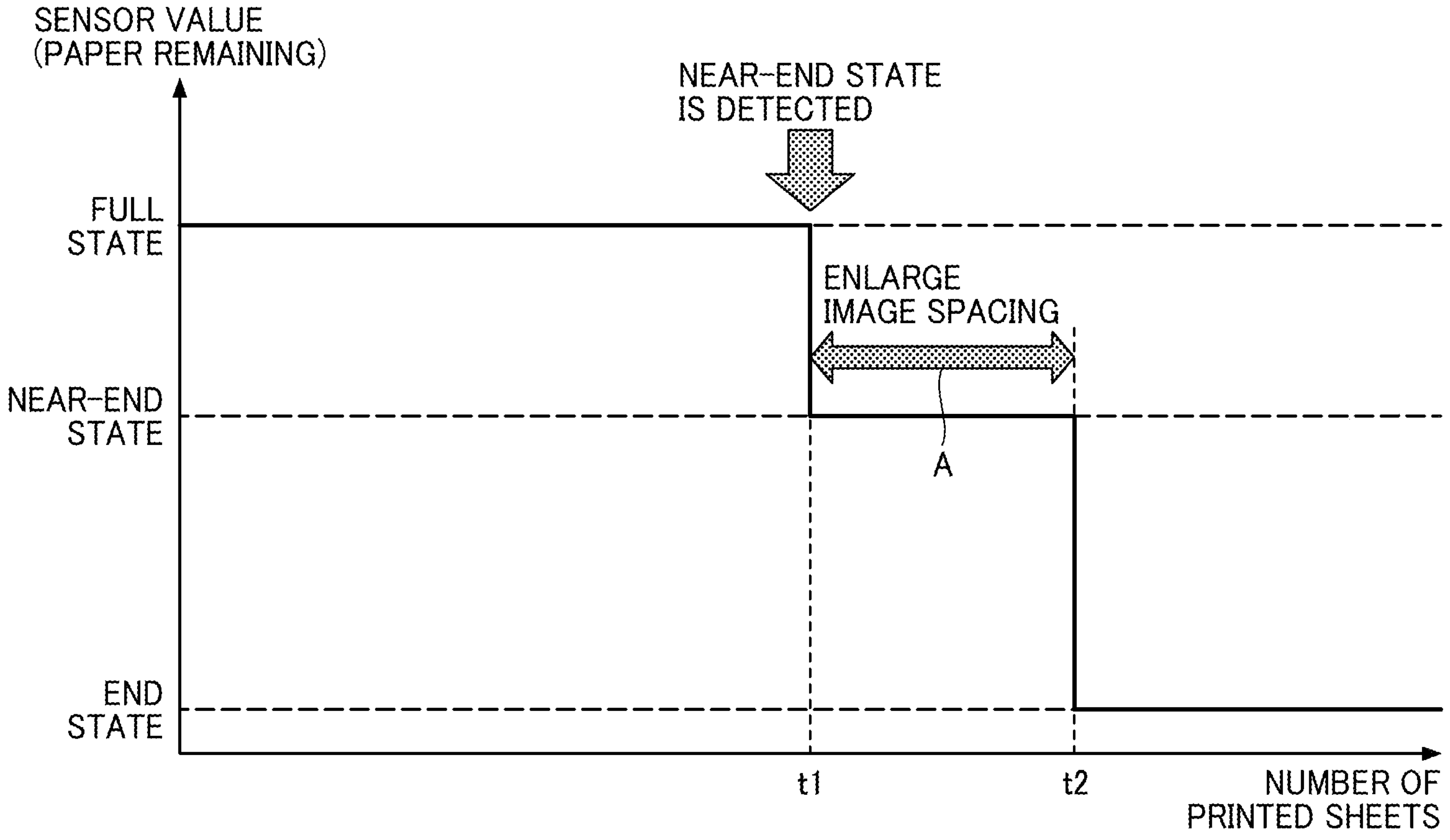
FIG. 7 is a diagram illustrating an outline of image-spacing enlarging control according to a first embodiment of the present disclosure.

FIG. 7 is a diagram illustrating an outline of the image-spacing enlarging control according to the first embodiment of the present disclosure. The horizontal axis of FIG. 7 represents the amount of sheets printed by the image forming apparatus 100, and the vertical axis represents the sensor value of the sheet detection sensor 16, in other words, the remaining amount of sheets in a sheet feed tray. As illustrated in FIG. 7, the sheet detection sensor 16 can detect three states of a full state, a near-end state, and a paper-end state.

In the image-spacing enlarging control, increasing the spacing of images P formed by the image forming device 2 leads to a decrease in productivity, and thus increasing the spacing of images P constantly is not preferable. Accordingly, in the present embodiment, the control unit 131 and the image writing control unit 134 of the control device 13 detect the remaining amount of sheets based on the sensor value of the sheet detection sensor 16, and increase the spacing of images from a time when a paper-end state approaches (near-end state). For example, as illustrated in FIG. 7, when a near-end state is detected while the number of printed sheets is t1, control is executed to increase the spacing of images over a period A until the number of printed sheets becomes t2 and a paper-end state is detected (i.e., a period in which the number of printed sheets is from t1 to t2).

In the first embodiment, with this configuration, the image spacing is increased by only the specific number of sheets immediately before the running-out of sheets while productivity is normally maintained. The activation of the retry function at the time of switching of the sheet feed tray can be prevented. Thus, wasteful consumption of toner can be reduced. As a result, the image forming apparatus 100 according to the first embodiment can achieve both reduction in wasteful toner consumption and maintenance of productivity.

Figure 8:
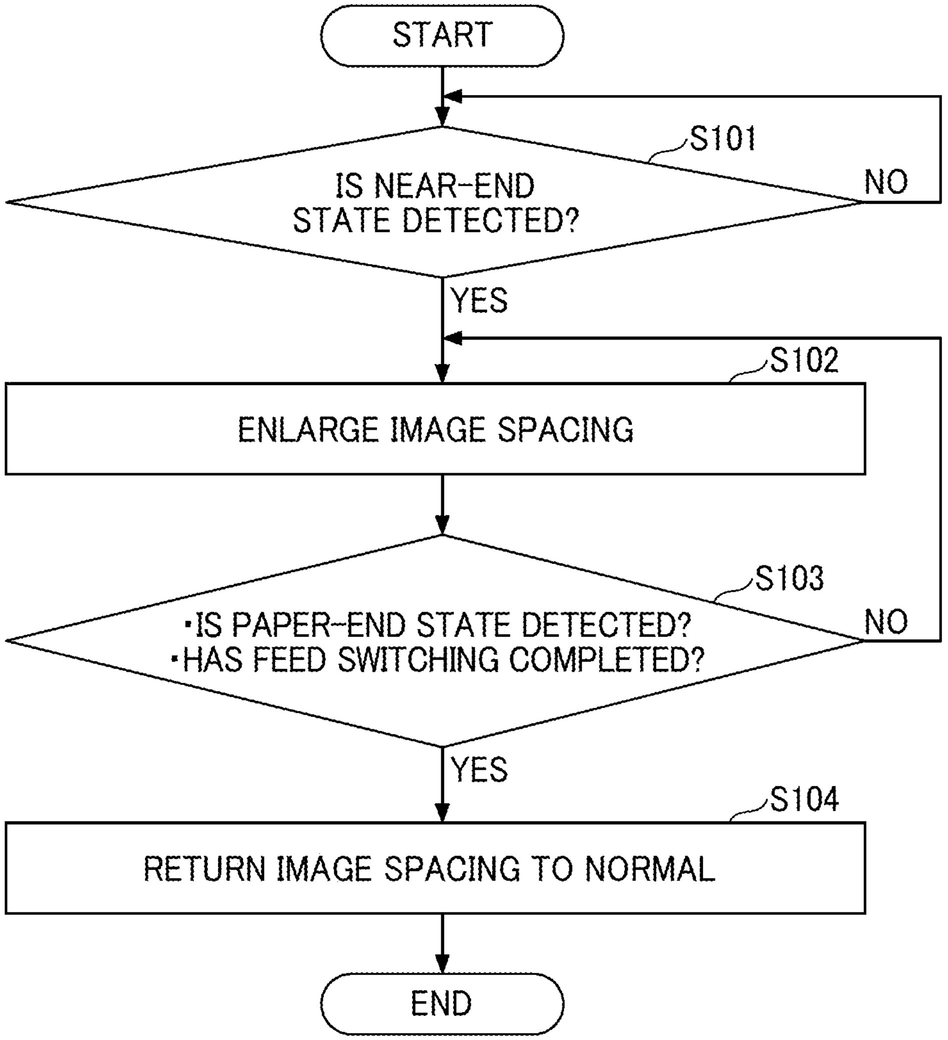
FIG. 8 is a flowchart of the image-spacing enlarging control according to the first embodiment of the present disclosure.

FIG. 8 is a flowchart of the image-spacing enlarging control according to the first embodiment of the present disclosure.

In step S101 of FIG. 8, the control unit 131 determines whether the near-end state of the sheet feed tray in use has been detected based on the sensor value of the sheet detection sensor 16. When the near-end state is not detected (NO in step S101 of FIG. 8), the process waits until the near-end state is detected. When the near-end state is detected (YES in step S101 of FIG. 8), the process proceeds to step S102 of FIG. 8.

In step S102 of FIG. 8, the spacing of images P formed by the image forming device 2 is increased in response to the detection of the near-end state.

In step S103 of FIG. 8, the control unit 131 detects a paper-end state of the sheet feed tray in use based on the sensor value of the sheet detection sensor 16, and determines whether switching of the sheet feed tray is completed. When the paper-end state is not detected or the switching is not completed (NO in step S103 of FIG. 8), the process returns to step S102 of FIG. 8 and the enlarging of the image spacing is continuously maintained.

On the other hand, when the paper-end state is detected and the switching is completed (YES in step S103 of FIG. 8), the process proceeds to step S104 of FIG. 8, and then the spacing of images P formed by the image forming device 2 returns to the normal state. The present control flow ends after the processing of step S104 of FIG. 8 is completed.

Figure 9:
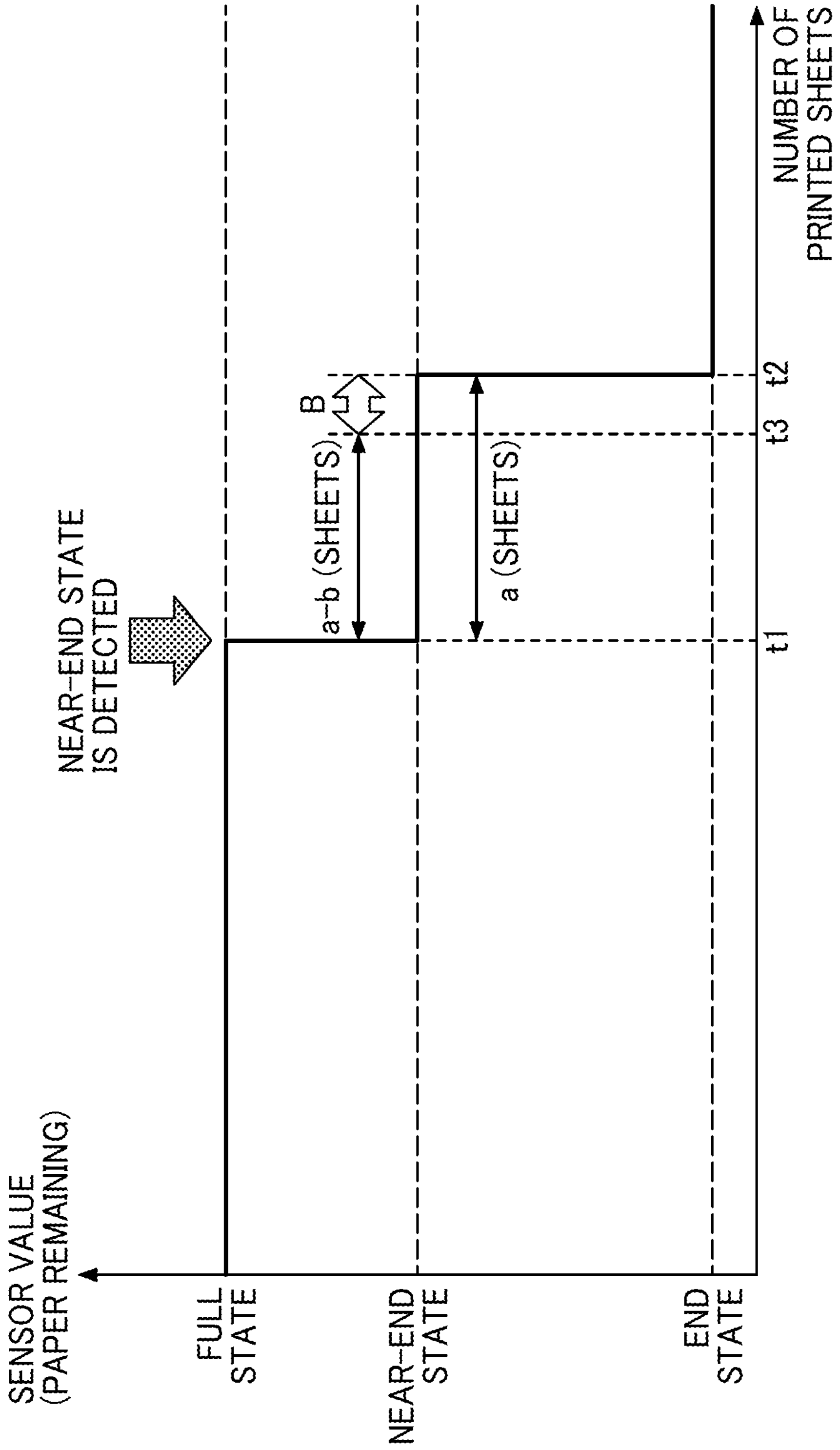
FIG. 9 is a diagram illustrating an outline of image-spacing enlarging control according to a modification of the first embodiment of the present disclosure.
Figure 10:
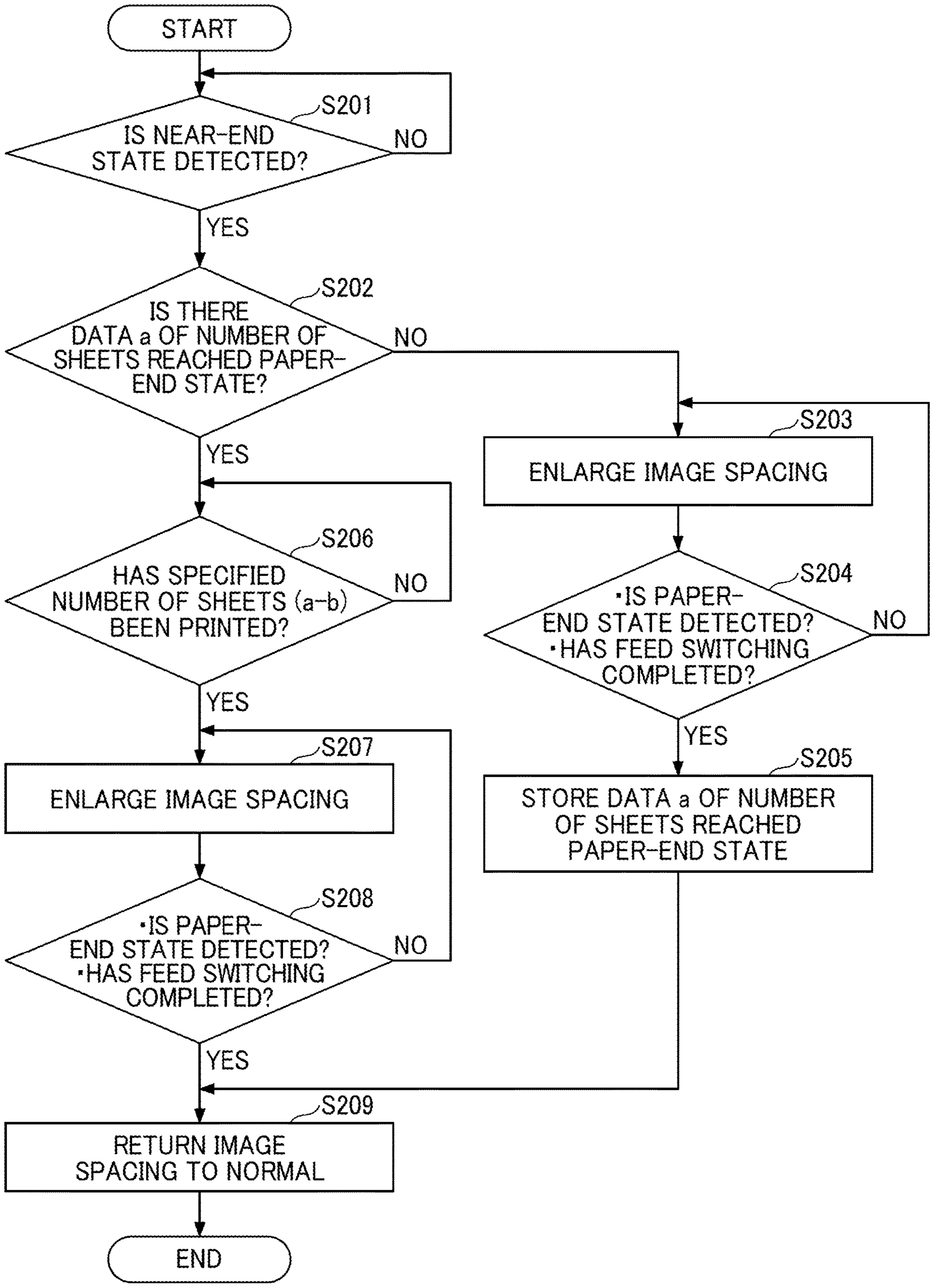
FIG. 10 is a flowchart of the image-spacing enlarging control according to the modification of the first embodiment of the present disclosure.

A description is given of a modification of the first embodiment with reference to FIGS. 9 and 10. FIG. 9 is a diagram illustrating an outline of image-spacing enlarging control according to the modification of the first embodiment of the present disclosure.

In order to prevent an unnecessary decrease in productivity in the image-spacing enlarging control, it is desirable that the timing at which the image spacing is enlarged is immediately before reaching the paper-end state as much as possible. Accordingly, as in the modification illustrated in FIG. 9, when the image-spacing enlarging control is executed for the first time, an allowable number of sheets is calculated based on the number of sheets fed from the sheet feed tray 3 in use until the sheets run out after the near-end state is detected by the sheet detection sensor 16, and a predicted number of sheets a that reaches the paper-end state is stored in, for example, a memory in the control device 13. When the near-end state is detected the next time or later, it is preferable that the spacing of images P formed by the image forming device 2 is increased after the allowable number of sheets are supplied after the near-end state is detected. More specifically, after printing is performed for (a-b) sheets from the detection of the near-end state, excluding a margin b sheets in consideration of an error for each sensor, with respect to the predicted number of sheets a that reaches the paper-end state, the image spacing starts to be increased.

For example, as illustrated in FIG. 9, after a near-end state is detected at the number of printed sheets t1, control is executed to increase the image spacing over a period B from a timing when the number of printed sheets becomes t3, at which only (a-b) sheets have been printed, to a timing when the number of printed sheets becomes t2 and a paper-end state is detected (i.e., the period when the number of printed sheets is from t3 to t2). The period B is shorter than the period A illustrated in FIG. 7. Accordingly, in the image-spacing enlarging control of the modification illustrated in FIG. 9, an execution period when the sheet feed tray is switched can be shortened and a period of a normal operation other than switching can be increased as compared with the image-spacing enlarging control illustrated in FIG. 7. Thus, productivity can be enhanced while maintaining the effect of reducing wasteful toner consumption.

FIG. 10 is a flowchart of the image-spacing enlarging control in the modification of the first embodiment of the present disclosure.

In step S201 of FIG. 10, the control unit 131 determines whether the near-end state of the sheet feed tray in use is detected based on the sensor value of the sheet detection sensor 16. When the near-end state is not detected (NO in step S201 of FIG. 10), the process waits until the near-end state is detected. When the near-end state is detected (YES in step S201 of FIG. 10), the process proceeds to step S202 of FIG. 10.

In step S202 of FIG. 10, the control unit 131 determines whether data on the number of sheets that reaches the paper-end state, that is, the above-described predicted number of sheets a that reaches the paper-end state is stored. When no data on the number of sheets that reaches the paper-end state (NO in step S202 of FIG. 10), the process proceeds to step S203 of FIG. 10. On the other hand, when there is data of the number of sheets that reaches the paper-end state (YES in step S202 of FIG. 10), the flow proceeds to step S206 of FIG. 10.

In step S203 of FIG. 10, the spacing of images P formed by the image forming device 2 is increased in response to the near-end state.

In step S204 of FIG. 10, the control unit 131 detects a paper-end state of the sheet feed tray in use based on the sensor value of the sheet detection sensor 16, and determines whether switching of the sheet feed tray is completed. When the paper-end state is not detected or the switching is not completed (NO in step S204 of FIG. 10), the flow returns to step S203 of FIG. 10 and the enlarging of the image spacing is continuously maintained.

On the other hand, when the paper-end state is detected and the switching is completed (YES in step S204 of FIG. 10), the process proceeds to step S205 of FIG. 10. The data on the number of sheets a that reaches the paper-end state is stored in the control device 13, and the process proceeds to step S209 of FIG. 10.

In step S206 of FIG. 10, the control unit 131 determines whether a specified number (a-b) of sheets have been printed after the detection of the near-end state. If the specified number (a-b) of sheets have not been printed (NO in step S206 of FIG. 10), the process waits until the specified number (a-b) of sheets have been printed.

On the other hand, when the specified number (a-b) of sheets have been printed (YES in step S206 of FIG. 10), the process proceeds to step S207 of FIG. 10, and in response to the detection that the specified number (a-b) of sheets have been printed, the spacing of images P formed by the image forming device 2 is increased.

In step S208 of FIG. 10, the control unit 131 detects a paper-end state of the sheet feed tray in use based on a sensor value of the sheet detection sensor 16, and determines whether switching of the sheet feed tray is completed. If the paper-end state is not detected or the switching is not completed (NO in step S208 of FIG. 10), the process returns to step S207 of FIG. 10 and the enlarging of the image spacing is continuously maintained.

On the other hand, when the paper-end state is detected and the switching is completed (YES in step S208 of FIG. 10), the process proceeds to step S209 of FIG. 10.

In step S209 of FIG. 10, the spacing of images P formed by the image forming device 2 returns to a normal state immediately or after an elapse of a predetermined time (which is a time for adjusting the positional relation between the sheet and the image). When the processing of step S209 of FIG. 10 is completed, the present control flow ends.

Second Embodiment

Figure 11A:
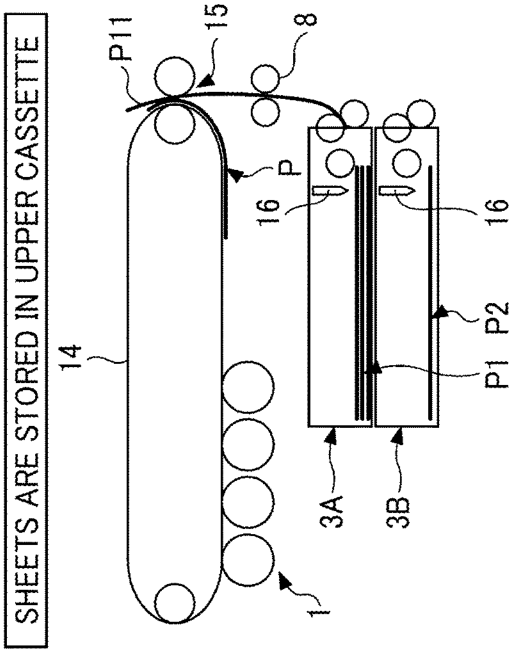
FIGS. 11A to 11D are diagrams illustrating an outline of image-forming-speed lowering control according to a second embodiment of the present disclosure.
Figure 11B:
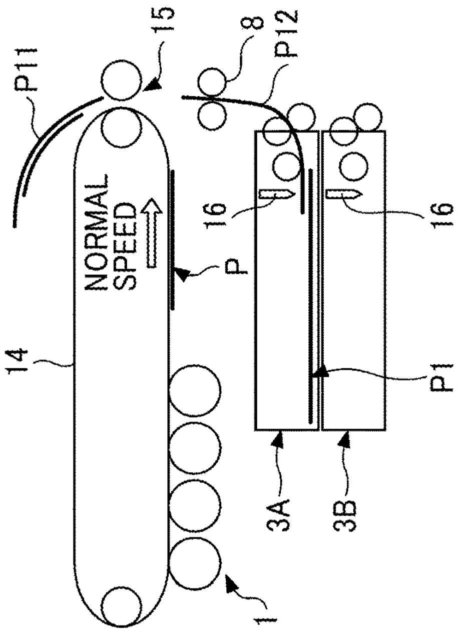
Figure 12:
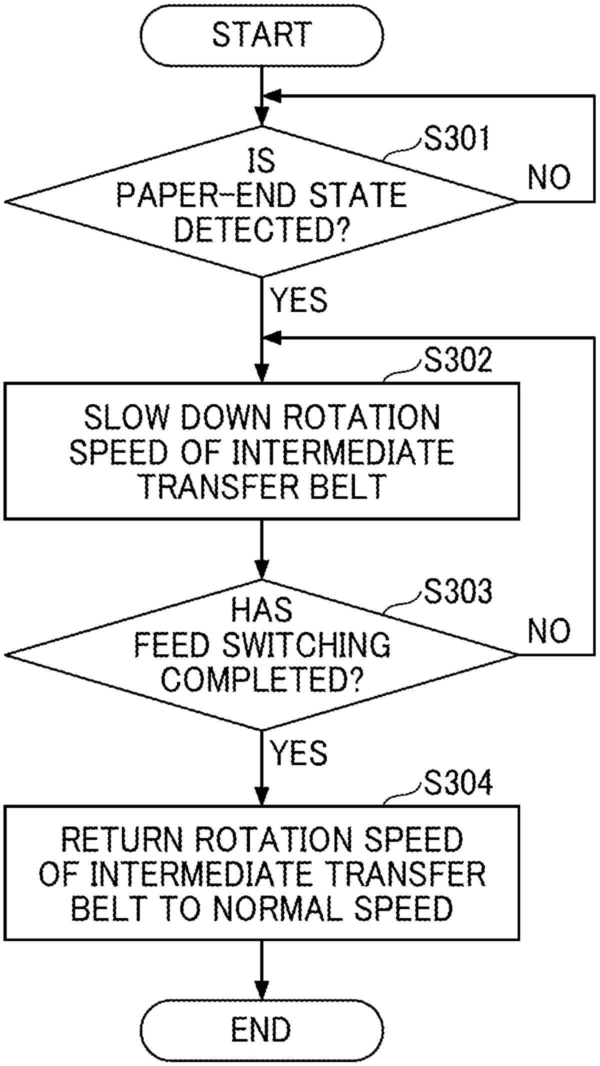
FIG. 12 is a flowchart of the image-forming-speed lowering control according to the second embodiment of the present disclosure.

With reference to FIGS. 11A, 11B, and 12, a description is given of the second embodiment of the present disclosure. FIGS. 11A and 11B are diagrams illustrating image-forming-speed lowering control according to the second embodiment of the present disclosure. FIGS. 11A and 11B illustrate print processing in a case where sheets are stacked in the upper cassette (sheet feed tray 3A). In this case, as illustrated in FIG. 11A, a sheet P11 is supplied from the sheet feed tray 3A to the transfer section 9, and the image P is transferred onto the sheet P11. Thereafter, as illustrated in FIG. 11B, when the sheet P11 on which the image is transferred passes through the secondary transfer device 15 and is conveyed downstream, the next sheet P12 is supplied from the same sheet feed tray 3A to the transfer section 9. Meanwhile, a new image P is transferred from the image bearer 1 onto the intermediate transfer belt 14 and moves toward the secondary transfer device 15 at normal speed. Thereafter, the image P is transferred onto the sheet P12 by the secondary transfer device 15.

Figure 11C:
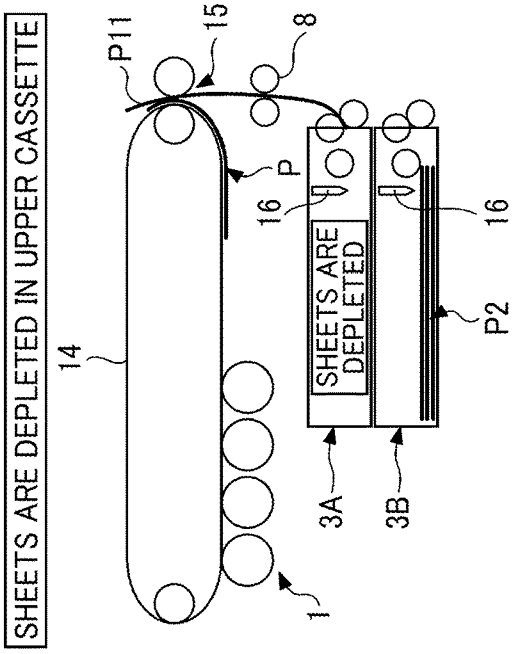
Figure 11D:
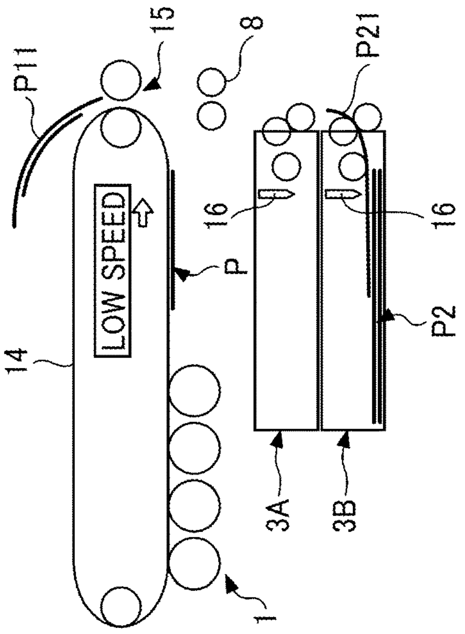

On the other hand, FIGS. 11C and 11D illustrate print processing in a case where sheets have run out in the upper cassette (sheet feed tray 3A). In this case, as illustrated in FIG. 11C, the last sheet P11 is supplied from the sheet feed tray 3A to the transfer section 9, and thus the image P is transferred to the sheet P11. Thereafter, as illustrated in FIG. 11D, when the sheet P11 on which the image is transferred is passed through the secondary transfer device 15 and conveyed downstream, the next sheet P21 is supplied from the lower cassette (i.e., another sheet feed tray 3B) to the transfer section 9. At this time, the operation of switching a sheet feed tray is performed, the timing of supplying the sheet P21 is delayed as compared with FIG. 11B. Accordingly, in the present embodiment, when a sheet feed tray is switched, as illustrated in FIG. 11D, the intermediate transfer belt 14 on which the new image P is transferred from the image bearer 1 moves at a lower speed than the normal speed illustrated in FIG. 11B. Such a configuration can match the timing at which the sheet P12 reaches the secondary transfer device 15 with the timing at which the image P on the intermediate transfer belt 14 reaches the secondary transfer device 15. The above-described description of “lower speed than normal speed” includes a case where a speed at which an image reaches the transfer position becomes low due to intermittent driving or temporary stopping of the transfer belt. In a case of intermittent driving or temporary stopping, switching between driving and stopping occurs during image formation, and an abnormal image such as a shock jitter may occur. For this reason, in a case of considering image quality, continuing driving at a low speed is preferable.

As described above, in the second embodiment, when running-out of sheets is detected, image-forming-speed lowering control is executed so that the image formation speed by the image forming device 2 and the transfer section 9 is lowered (at least the rotation speed of the intermediate transfer belt 14 is lowered) during a period from a time when the immediately preceding sheet P11 has passed through the secondary transfer position to a time when the next sheet P21 reaches. As with the first embodiment, this configuration can prevent the retry function from being activated when a sheet feed tray is switched. Thus, wasteful consumption of toner can be reduced. The image forming speed is maintained at a normal speed in a normal state other than a time of switching of a sheet feed tray, so that productivity can be maintained in a normal state in the same manner as the first embodiment. As a result, the image forming apparatus 100 according to the second embodiment can also achieve both reduction in wasteful toner consumption and maintenance of productivity.

FIG. 12 is a flowchart of image-forming-speed lowering control in the second embodiment of the present disclosure.

In step S301 of FIG. 12, the control unit 131 determines whether the paper-end state of the sheet feed tray in use has been detected based on the sensor value of the sheet detection sensor 16. When the paper-end state is not detected (NO in step S301 of FIG. 12), the process waits until the paper-end state is detected. When the paper-end state is detected (YES in step S301 of FIG. 12), the process proceeds to step S302 of FIG. 12.

In step S302 of FIG. 12, the rotation speed of the intermediate transfer belt 14 is changed to a low speed that is lower than a normal speed in response to the detection of the paper-end state.

In step S303 of FIG. 12, the control unit 131 determines whether switching of the sheet feed tray is completed. When the switching is not completed (NO in step S303 of FIG. 12), the process returns to step S302 of FIG. 12 and the low speed of the intermediate transfer belt 14 is continuously maintained.

On the other hand, when the switching is completed (YES in step S303 of FIG. 12), the process proceeds to step S304 of FIG. 12, and the rotation speed of the intermediate transfer belt 14 is returned to the normal speed immediately or after an elapse of a specified time (which is a time for adjusting the positional relation between the sheet and the image). When the processing of step S304 of FIG. 12 is completed, the present control flow ends.

Third Embodiment

Figure 13:
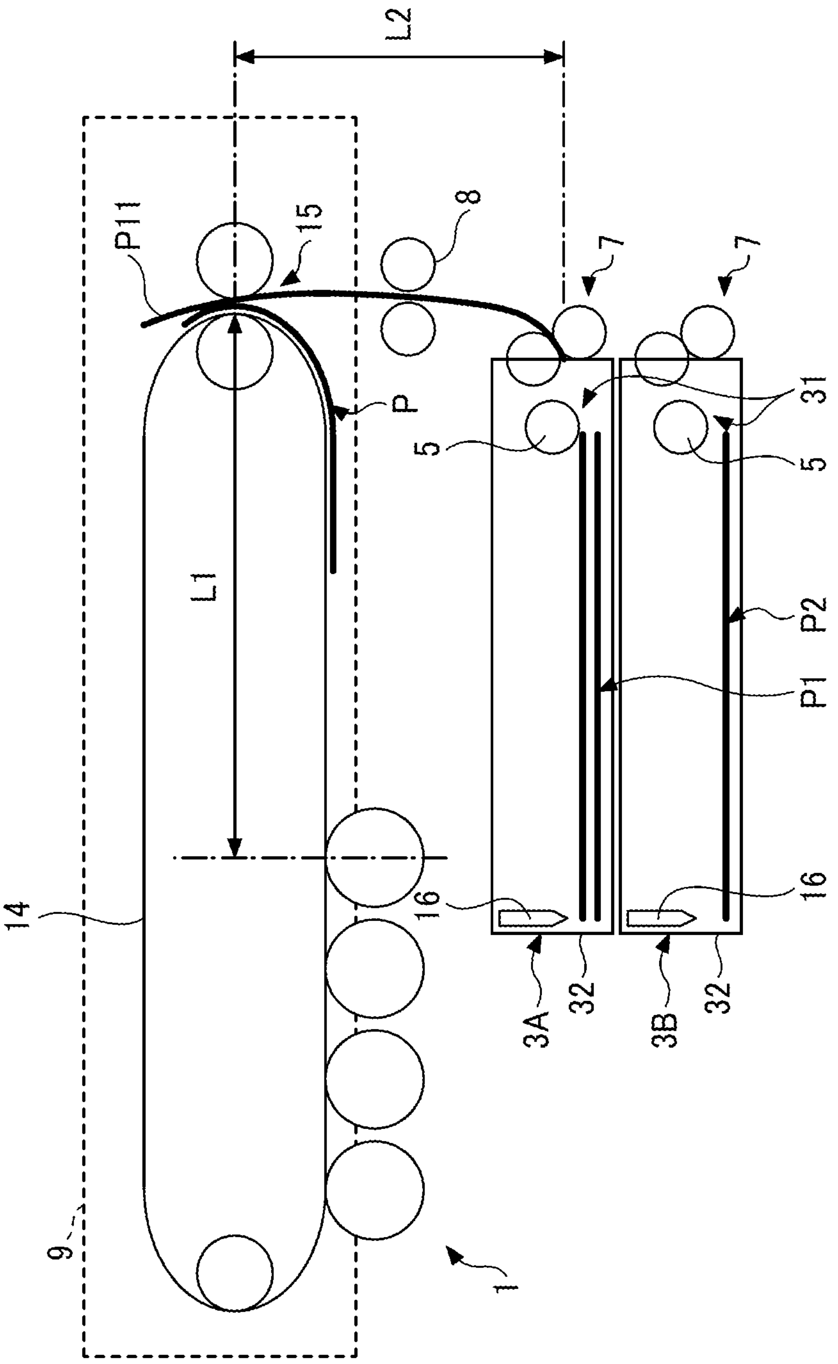
FIG. 13 is a diagram illustrating a configuration of a transfer section according to a third embodiment of the present disclosure.
Figure 14:
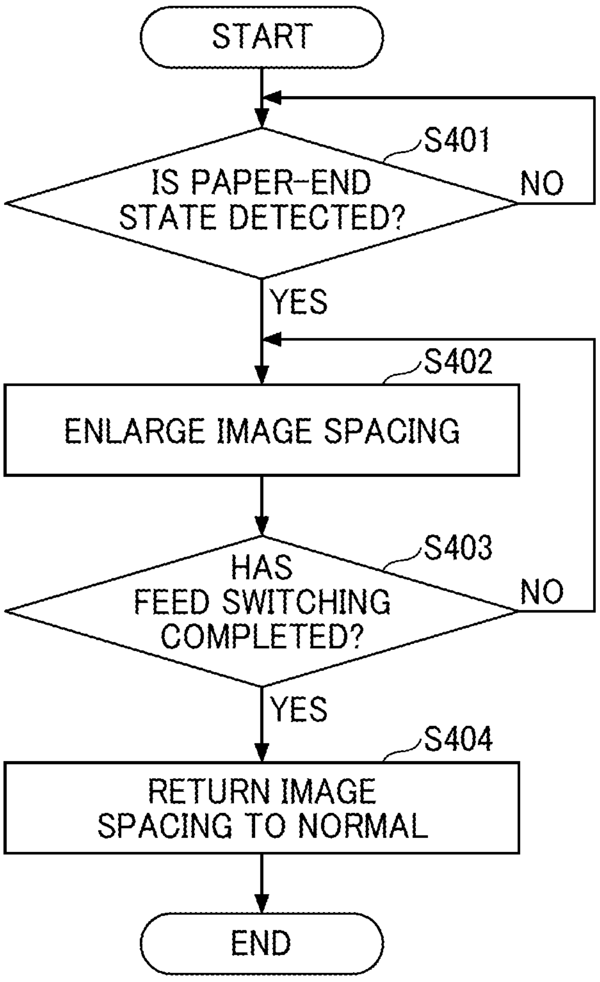
FIG. 14 is a flowchart of image-spacing enlarging control according to the third embodiment of the present disclosure.

A description is given of the third embodiment with reference to FIGS. 13 and 14. FIG. 13 is a diagram illustrating the configuration of the transfer section 9 according to the third embodiment of the present disclosure.

As illustrated in FIG. 13, in the third embodiment, the sheet detection sensor 16 is disposed adjacent to an end fence 32 opposite the sheet feed port 31 in each of the sheet feed trays 3A and 3B. When the sheet detection sensor 16 detects that sheets run out in the sheet feed tray 3A in use, the control device 13 increases the spacing between images P formed by the image forming device 2.

With this configuration, when the sheets run out, image spacing is widened in a pinpoint manner at the time of detection of running-out of the sheets, so that activation of a retry function at the time of switching of the sheet feed tray can be prevented. Thus, wasteful consumption of toner can be reduced. In the image-spacing enlarging control of the third embodiment, as compared with the image-spacing enlarging control of the first embodiment illustrated in FIGS. 7 and 9, the execution period when the sheet feed tray is switched can be further reduced, and the period of a normal operation other than the switching time can be further increased. Thus, productivity can be further enhanced while maintaining the effect of reducing wasteful toner consumption.

FIG. 14 is a flowchart of the image-spacing enlarging control according to the third embodiment of the present disclosure.

In step S401 of FIG. 14, the control unit 131 determines whether the paper-end state of the sheet feed tray in use is detected based on the sensor value of the sheet detection sensor 16. If the paper-end state is not detected (NO in step S401 of FIG. 14), the process waits until the paper-end state is detected. When the paper-end state is detected (YES in step S401 of FIG. 14), the process proceeds to step S402 of FIG. 14.

In step S402 of FIG. 14, the spacing of images P formed by the image forming device 2 is increased in response to the detection of the paper-end state.

In step S403 of FIG. 14, the control unit 131 determines whether switching of the sheet feed tray is completed. If the switching is not completed (NO in step S403 of FIG. 14), the process returns to step S402 of FIG. 14 and the enlargement of the image spacing is continuously maintained.

On the other hand, when the switching is completed (YES in step S403 of FIG. 14), the process proceeds to step S404 of FIG. 14, and then the spacing of images P formed by the image forming device 2 returns to a normal state immediately or after an elapse of a specified time (which is the time for adjusting the positional relation between the sheet and the image). When the processing of step S404 of FIG. 14 is completed, the present control flow ends.

Also in the image-forming-speed lowering control of the second embodiment, a configuration may be adopted in which the sheet detection sensor 16 is arranged adjacent to the end fence 32 of the sheet feed trays 3A and 3B as in the third embodiment. With such a configuration, the paper-end state can be detected with advanced timing, the image-forming-speed lowering control can be executed more accurately. As a result, the effect of the second embodiment in which both reduction in wasteful toner consumption and maintenance of productivity can be achieved can be accelerated.

The embodiments of the present disclosure are described above with reference to specific examples. However, the present disclosure is not limited to the above-described specific examples. The modified specific examples including the features of the present disclosure, in which a person skilled in the art appropriately implements a design change, are also included in the scope of the present disclosure. For example, each element included in each specific example described above and the arrangement, condition, and shape thereof are not limited to the above-described specific examples and can be appropriately changed. The respective elements included in the above-described specific examples can be appropriately combined with each other unless technically contradicted.

In the above-described embodiment, as described with reference to FIG. 2, a description is given of a case where the image forming apparatus 100 has a structure in which the distance L2 from the sheet feed port 31 of the sheet feed tray 3A (or the sheet feed tray 3B) to the transfer position is shorter than the distance L1 from the image forming device 2 (the image bearer 1) to the transfer position (the contact position of the roller pair of the secondary transfer device 15) at which the transfer section 9 transfers the image P onto the sheet P11 (L1>L2). However, the image-spacing enlarging control according to the first embodiment and the third embodiment, and the image-forming-speed lowering control according to the second embodiment can also be applied to an image forming apparatus having a structure that does not satisfy the relation of L1>L2 described above. For example, a structure in which the distances L1 and L2 are equal to or substantially equal to each other, a structure in which the distance L2 is sufficiently long relative to the sheet length, and a structure that takes time to reach the transfer section 9 from the sheet feed tray 3 may be adopted.

Even in an image forming apparatus having a structure that does not satisfy the relation of L1>L2 described above, in a case where sheets run out in a sheet feed tray in use, a situation may occur in which a sheet supplied from another sheet feed tray is not in time at a timing at which an image P already formed in the image forming device 2 arrives at the secondary transfer device 15. Even in a case where such a situation occurs, the effects of the image-spacing enlarging control according to the first embodiment and the third embodiment and the effect of the image-forming-speed lowering control according to the second embodiment can be obtained.

In FIG. 2, the distance L1 is defined as the distance from the image bearer closest to the transfer position to the transfer position. However the distance L1 may be defined as the distance from the image bearer farthest from the transfer position to the transfer position (L1*a*). Such a configuration can prevent images formed on the image bearers of all colors being wasted even when the images are formed in full color.

Alternatively, the image bearer closest to the transfer position in FIG. 2 is used for black image formation, and the other three image bearers are used for full color (cyan, magenta, and yellow). Control is executed using the distance L1 in monochrome printing, and the distance L1*a* may be used in full-color printing. With such a configuration, waste toner can also be reduced to a minimum amount while a decrease in productivity in monochrome printing is reduced to a minimum amount.

The above-described embodiment illustrates a configuration in which the image-spacing enlarging control according to the first and third embodiments and the image-forming-speed lowering control according to the second embodiment are executed at a timing when the near-end state or the paper-end state is detected by the sheet detection sensor 16. However the timing at which the control is executed is not limited to the time of detection of the near-end state or the paper-end state. Any configuration may be adopted as long as each of the above controls is executed when the remaining amount of sheets in the sheet feed tray in use becomes equal to or smaller than a specified threshold value based on at least a detection result of the sheet detection sensor 16.

Aspects of the present disclosure may be, for example, combinations of first to seventh aspects as follows.

First Aspect

An image forming apparatus (e.g., the image forming apparatus 100) includes an image forming device (e.g., the image forming device 2), a transfer section (e.g., the transfer section 9), a plurality of sheet feed trays (e.g., the sheet feed tray 3A and the sheet feed tray 3B), a control device (e.g., the control device 13), and a detector (e.g., the sheet detection sensor 16). The image forming device forms an image (e.g., the image P) onto a sheet (e.g., the sheet P11 and the sheet P12). The transfer section transfers the image onto the sheet. The plurality of sheet feed trays store the sheet and supply the sheet from a sheet feed port (e.g., the sheet feed port 31) to the transfer section. The control device switches the sheet feeding from one sheet feed tray to another sheet feed tray when the sheet runs out in the sheet feed tray in use. The detector detects a remaining amount of sheets in the sheet feed tray in use. The control device enlarges a spacing between images formed by the image forming device when the remaining amount of sheets of the sheet feed tray in use is equal to or less than a specified threshold value based on a detection result of the detector.

Second Aspect

The image forming apparatus (e.g., the image forming apparatus 100) according to the first aspect, a distance from the sheet feed port (e.g., the sheet feed port 31) of the sheet feed tray (e.g., the sheet feed tray 3A and the sheet feed tray 3B) to a transfer position is shorter than a distance from the image forming device (e.g., the image forming device 2) to the transfer position of the image (e.g., the image P) to the sheet (e.g., the sheet P11 and the sheet P12) by the transfer section (e.g., the transfer section 9).

Third Aspect

The image forming apparatus (e.g., the image forming apparatus 100) according to the first or second aspect, the detector (e.g., the sheet detection sensor 16) includes a sensor that detects a near-end state of the sheet feed tray (e.g., the sheet feed tray 3A and the sheet feed tray 3B) in use. The control device (e.g., the control device 13) increases the spacing between the images (e.g., the image P) formed by the image forming device (e.g., the image forming device 2) after the near-end state is detected by the sensor.

Fourth Aspect

The image forming apparatus (e.g., the image forming apparatus 100) according to the third aspect, the control device (e.g., the control device 13) calculates an allowable number of sheets (e.g., the sheet P11 and the sheet P12) based on the number of sheets supplied from the sheet feed tray (e.g., the sheet feed tray 3A and the sheet feed tray 3B) in use until the sheets run out after the near-end state is detected by the sensor. When the near-end state is detected next time, the control device enlarges the spacing between the images formed by the image forming device after the allowable number of sheets are supplied after the near-end state is detected.

Fifth Aspect

An image forming apparatus (e.g., the image forming apparatus 100) includes an image forming device (e.g., the image forming device 2), a transfer section (e.g., the transfer section 9), a plurality of sheet feed trays (e.g., the sheet feed tray 3A and the sheet feed tray 3B), a control device (e.g., the control device 13), and a detector (e.g., the sheet detection sensor 16). The image forming device forms an image (e.g., the image P) onto a sheet (e.g., the sheet P11 and the sheet P12). The transfer section transfers the image onto the sheet. The plurality of sheet feed trays store the sheet and supply the sheet from a sheet feed port (e.g., the sheet feed port 31) to the transfer section. The control device switches the sheet feeding from one sheet feed tray to another sheet feed tray when the sheet runs out in the sheet feed tray in use. The detector detects a remaining amount of sheets of the sheet feed tray in use. The control device slows down an image forming speed of the image formed by the image forming device based on the detection result of the detector in a specified time from a time when the next sheet is fed from said another sheet feed tray to a time when the next sheet has reached the transfer section when the sheet runs out in the sheet feed tray in use.

Sixth Aspect

An image forming apparatus (e.g., the image forming apparatus 100) includes an image forming device (e.g., the image forming device 2), a transfer section (e.g., the transfer section 9), a plurality of sheet feed trays (e.g., the sheet feed tray 3A and the sheet feed tray 3B), a control device (e.g., the control device 13), and a detector (e.g., the sheet detection sensor 16). The image forming device forms an image (e.g., the image P) onto a sheet (e.g., the sheet P11 and the sheet P12). The transfer section transfers the image onto the sheet. The plurality of sheet feed trays store the sheet and supply the sheet from a sheet feed port (e.g., the sheet feed port 31) to the transfer section. The control device switches the sheet feeding from one sheet feed tray to another sheet feed tray when the sheet runs out in the sheet feed tray in use. The detector detects a remaining amount of sheets of the sheet feed tray in use. The control device slows down an image forming speed of the image formed by the image forming device based on the detection result of the detector until the next sheet fed from another sheet feed tray reaches the transfer section when the sheet runs out in the sheet feed tray in use.

Seventh Aspect

The image forming apparatus (e.g., the image forming apparatus 100) according to the fifth aspect, the detector (e.g., the sheet detection sensor 16) includes a sensor that detects that the sheet runs out in the sheet feed tray (e.g., the sheet feed tray 3A and the sheet feed tray 3B) in use. The sensor is disposed adjacent to an end fence (e.g., the end fence 32) opposite to a sheet feed port (e.g., the sheet feed port 31) of the sheet feed tray.

Eighth Aspect

An image forming apparatus (e.g., the image forming apparatus 100) includes an image forming device (e.g., the image forming device 2), a transfer section (e.g., the transfer section 9), a plurality of sheet feed trays (e.g., the sheet feed tray 3A and the sheet feed tray 3B), a control device (e.g., the control device 13), and a sensor (e.g., the sheet detection sensor 16). The image forming device forms an image (e.g., the image P) onto a sheet (e.g., the sheet P11 and the sheet P12). The transfer section transfers the image onto the sheet. The plurality of sheet feed trays store the sheet and supply the sheet from a sheet feed port (e.g., the sheet feed port 31) to the transfer section. The control device switches the sheet feeding from one sheet feed tray to another sheet feed tray when the sheet runs out in the sheet feed tray in use. The sensor is disposed adjacent to an end fence (e.g., the end fence 32) and detects running-out of the sheet stored in the paper feed tray in use. The control device enlarges a spacing between the images formed by the image forming device when the running-out of the sheet stored in the sheet feed tray in use is detected by the sensor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an image forming device, including a plurality of image bearers, configured to form an image onto a sheet;

a transfer section configured to transfer the image onto the sheet;

a plurality of sheet feed trays configured to:

store sheets; and supply the sheets from a sheet feed port of each of the plurality of sheet feed trays to the transfer section;

processing circuitry configured to switch sheet feeding from one sheet feed tray in use to another sheet feed tray of the plurality of sheet feed trays when the sheets run out in the one sheet feed tray in use; and a detector configured to detect a remaining amount of sheets in the one sheet feed tray in use, wherein the detector includes a sensor that detects a near-end state of the one sheet feed tray in use, wherein the processing circuitry is configured to execute an image-spacing enlarging control to enlarge spacing between images formed by the image forming device in response to detecting the near-end state by the sensor, calculate an allowable number of sheets, based on a number of sheets supplied from the one sheet feed tray in use until the sheets run out after an initial detection of the near-end state by the sensor that causes the image-spacing enlarging control for a first time, and in response to a subsequent detection of the near-end state by the sensor, execute another image-spacing enlarging control after the allowable number of sheets are supplied since the subsequent detection of the near-end state by the sensor.

2. An image forming apparatus comprising:

an image forming device, including a plurality of image bearers, configured to form an image onto a sheet;

a transfer section configured to transfer the image onto the sheet, the transfer section including a transfer belt that move the image transferred from the plurality of image bearers;

a plurality of sheet feed trays configured to:

store sheets; and supply the sheets from a sheet feed port each of the plurality of sheet feed trays to the transfer section;

processing circuitry configured to switch sheet feeding from one sheet feed tray to another sheet feed tray of the plurality of sheet feed trays when the sheets run out in the one sheet feed tray in use; and a detector configured to detect a remaining amount of sheets of the one sheet feed tray in use, wherein the processing circuitry is configured to, when the sheets run out in the one sheet feed tray in use, lower a speed of the transfer belt, based on a detection result of the detector, in a specified time from a time when a sheet is fed from the another sheet feed tray to a time when the sheet has reached the transfer section.

3. The image forming apparatus according to claim 2, wherein the processing circuitry is configured to, when the sheets run out in the one sheet feed tray in use, lower the speed of the transfer belt, based on a detection result of the detector, until a sheet fed from the another sheet feed tray reaches the transfer section.

4. The image forming apparatus according to claim 2, wherein the detector includes a sensor that detects that the sheets run out in the one sheet feed tray in use, and wherein each of the plurality of sheet feed trays has an end fence opposite the sheet feed port, and the sensor is disposed adjacent to the end fence.

5. The image forming apparatus according to claim 1, wherein a distance between the sheet feed port of each of the plurality of sheet feed trays and a transfer position at which the image is transferred to the sheet by the transfer section is shorter than a distance between the transfer position and one of the plurality of image bearers that is closest to the transfer position.

6. The image forming apparatus according to claim 2, wherein a distance between the sheet feed port of each of the plurality of sheet feed trays and a transfer position at which the image is transferred to the sheet by the transfer section is shorter than a distance between the transfer position and one of the plurality of image bearers that is closest to the transfer position.

7. The image forming apparatus according to claim 1, wherein the processing circuitry is configured to store the allowable number of sheets as a predicted number of sheets that reaches a paper-end state, and start enlarging the spacing between the images after printing is performed for a reduced number of sheets in response to the subsequent detection of the near-end state, the reduced number of sheets calculated by excluding a predetermined margin number of sheets from the predicted number of sheets.

8. The image forming apparatus according to claim 7, the predetermined margin number of sheets is determined in consideration of an error of the sensor.

* * * * *